United States Patent [19]

Shiga et al.

[11] 4,355,144
[45] Oct. 19, 1982

[54] PROCESS FOR PRODUCING A PROPYLENE-ETHYLENE COPOLYMER HAVING IMPROVED STRETCHABILITY

[75] Inventors: Akinobu Shiga; Kiyoshi Matsuyama; Masahiro Kakugo; Yukio Naito; Seiichiro Ima; Katsuyoshi Yamashita, all of Niihama, Japan

[73] Assignee: Sumitomo Chemical Company Limited, Osaka, Japan

[21] Appl. No.: 257,431

[22] Filed: Apr. 24, 1981

Related U.S. Application Data

[63] Continuation-in-part of Ser. No. 181,319, Aug. 25, 1980, abandoned.

[30] Foreign Application Priority Data

Aug. 24, 1979 [JP] Japan ................................ 54-108341

[51] Int. Cl.$^3$ ............................................... C08F 4/64
[52] U.S. Cl. ..................................... 526/137; 264/164; 526/142; 526/348; 526/348.1
[58] Field of Search ................................ 526/137, 142

[56] References Cited

U.S. PATENT DOCUMENTS 3,671,383 6/1972 Sakata et al. ...................... 526/348.1
4,123,387 10/1978 Shiga et al. ....................... 252/429 B
4,165,298 8/1979 Shiga et al. ....................... 252/429 B

FOREIGN PATENT DOCUMENTS 1391068 4/1975 United Kingdom .

OTHER PUBLICATIONS

Translated Abstract–Japanese Pat. App., Opi No. Sho–51-46598.

Primary Examiner—Stanford M. Levin
Attorney, Agent, or Firm—Sughrue, Mion, Zinn, Macpeak & Seas

[57] ABSTRACT

In a process for producing polypropylene comprising polymerizing propylene in the presence of hydrogen and a catalyst system comprising (A) titanium trichloride obtained by reducing titanium tetrachloride with an organoaluminum compound and reacting the reduced solid with an ether represented by the formula:

$$R^1\text{-O-}R^2$$

wherein $R^1$ and $R^2$ are defined hereinbefore, and a halogen compound selected from the group consisting of (i) halogen or interhalogen compounds of the formula, $X^1X^2_a$ (wherein $X^1$, $X^2$ and a are defined hereinbefore), (ii) titanium halides, and (iii) organic halogen compounds, simultaneously or successively and (B) an organoaluminum compound, the improvement which comprises supplying ethylene together with propylene to the polymerization system such that the ethylene concentration in the vapor phase of the system based on the total amount of propylene, ethylene and hydrogen in the vapor phase of the system is 0.15 to 1.5 mol % to obtain a propylene-ethylene copolymer having an ethylene content of from 0.1 to 1.0 wt % is disclosed. The propylene-ethylene copolymer is improved in stretchability.

3 Claims, No Drawings

PROCESS FOR PRODUCING A PROPYLENE-ETHYLENE COPOLYMER HAVING IMPROVED STRETCHABILITY

CROSS-REFERENCE TO RELATED APPLICATIONS

This application is a continuation-in-part of U.S. Patent Application Ser. No. 181,319, filed Aug. 25, 1980, now abandoned.

FIELD OF THE INVENTION

This invention relates to a process for producing a propylene-ethylene copolymer having improved stretchability.

BACKGROUND OF THE INVENTION

Polypropylene is a synthetic resin having high rigidity and mechanical strength. Since uniaxially or biaxially stretched polypropylene has greatly improved mechanical strength, transparency and cold resistance, it is widely used in the production of a stretched tape, yarn or biaxially stretched film.

A catalyst system comprising titanium trichloride prepared by reducing titanium tetrachloride with an organoaluminum compound and activating the reduction product by a specific method, and an organoaluminum halide is used with advantage in commercial production of polypropylene because propylene polymerizes at a fast rate and only a small amount of an amorphous polymer having low commercial value is produced as a by-product. But recent studies have shown that polypropylene produced using such catalyst is low in stretchability and is apt to develop cracking upon stretching at high ratio, which results in insufficient improvement in the physical properties of the polymer by stretching.

It is generally known to copolymerize propylene and ethylene using a catalyst system comprising titanium trichloride and an organoaluminum halide. One reason to copolymerize propylene and ethylene is to reduce the melting point of polypropylene as much as possible so that a film of the propylene copolymer has good heat sealability and other properties. Therefore, to reduce the melting point of the propylene copolymer, it is necessary that the copolymer contain at least 1.5 wt% of ethylene. However, the propylene copolymer having incorporated therein at least 1.5 wt% of ethylene for improving its heat sealability provides only a film having very poor mechanical properties, particularly, very low Young's modulus. Another defect with such propylene copolymer is that its stretchability has a tendency to decrease with the increase in the ethylene content.

SUMMARY OF THE INVENTION

As a result of various studies to eliminate these defects of the conventional propylene copolymer, it has been found that a propylene copolymer having improved stretchability without sacrificing Young's modulus and other mechanical properties can be produced by incorporating a specified amount of ethylene in the polymer using a specific type of titanium trichloride.

Therefore, one object of this invention is to provide a process for producing a propylene copolymer having improved stretchability.

Another object of this invention is to provide a process for producing a propylene copolymer that provides a stretched film having good physical properties.

DETAILED DESCRIPTION OF THE INVENTION

This invention provides a process for producing a propylene-ethylene copolymer by copolymerizing propylene and a small amount of ethylene in the presence of a catalyst system composed of:

(A) titanium trichloride obtained by reducing titanium tetrachloride with an organoaluminum compound and reacting the reduced solid with a complexing agent and a halogen compound simultaneously or successively; and (B) an organoaluminum compound, and in this process, ethylene is supplied to the polymerization system together with propylene so that the ethylene content in the resulting polymer is in the range of from 0.1 to 1.0 wt%.

The propylene-ethylene copolymer produced by this invention has improved stretchability and can be stretched at high ratio to provide a stretched product having good mechanical properties.

Titanium trichloride used in the present invention as catalyst component (A) is obtained by reducing titanium tetrachloride with an organoaluminum compound and reacting the reduced solid with a complexing agent and a halogen compound simultaneously or successively.

The organoaluminum compound used for the reduction of titanium tetrachloride is represented by the formula:

$$AlR_lX_{3-l}$$

wherein R represents a straight chain, branched chain or cyclic alkyl group or aryl group having up to 18 carbon atoms and X represents a halogen atom or hydrogen atom and $l$ is a number $1 \leq l \leq 3$. Examples of these organoaluminum compounds include methyl aluminum dichloride, ethyl aluminum dichloride, n-propyl aluminum dichloride, ethyl aluminum sesquichloride, dimethyl aluminum chloride, diethyl aluminum chloride, di-n-propyl aluminum chloride, trimethyl aluminum, triethyl aluminum, triisobutyl aluminum, ethyl dicyclohexyl aluminum, triphenyl aluminum, diethyl aluminum hydride, diisobutyl aluminum hydride, diethyl aluminum bromide and diethyl aluminum iodide.

Of the above compounds, diethyl aluminum chloride and ethyl aluminum sesquichloride provide especially preferred results.

The reduction reaction is carried out at about −60° C. to about 60° C., preferably −30° C. to 30° C. There is no particular restriction on the reaction time, but the reaction time usually ranges from about 1 to about 10 hours. In order to complete the reduction of titanium tetrachloride to titanium trichloride, an after-reaction at an elevated temperature not exceeding about 150° C. is preferably performed. Preferably the reduction reaction is carried out in an inert hydrocarbon solvent such as pentane, hexane, heptane, octane or decane. The reduced product may optionally be heat-treated in the presence or absence of an inert hydrocarbon solvent. A suitable heat-treatment temperature is about 100° to about 180° C. There is no particular restriction on the heat-treatment time, but usually periods of 30 minutes to 5 hours are convenient.

A preferred complexing agent is an ether compound of the formula:

$$R^1\text{-O-}R^2$$

wherein $R^1$ and $R^2$ are each a straight chain, branched chain or cyclic alkyl group having 1 to 10 carbon atoms. Representative ethers include diethyl ether, di-n-propyl ether, diisopropyl ether, di-n-butyl ether, diisoamyl ether, dineopentyl ether, di-n-hexyl ether, di-n-octyl ether, methyl n-butyl ether, methyl isoamyl ether, ethyl isobutyl ether, etc. Of these ether compounds, di-n-butyl ether and diisoamyl ether give especially preferred results.

The reaction of the reduction product with the ether compound is advantageously carried out in the presence of a diluent. Suitable diluents which can be used are inert hydrocarbons such as hexane, heptane, octane, decane, decalin, benzene, toluene or xylene.

In the present invention, the ether compound may be added to titanium tetrachloride prior to the reduction, to the reaction mixture during the reduction reaction, to the reduced solid or a halogen compound-treated solid as it is or diluted with an inert hydrocarbon solvent.

The amount of the ether compound used is about 0.05 to about 3.0 mols, preferably 0.5 to 1.5 mols, per mol of titanium trichloride. The reaction temperature is desirably about 0° to about 150° C. There is no particular limitation on the treatment time, but periods of about 20 minutes to about 5 hours are used conveniently.

Preferred halogen compounds are:

(i) halogen or interhalogen compounds of the formula:

$$X^1X^2{}_a$$

wherein $X^1$ and $X^2$ are each a chlorine, bromine or iodine atom and a is a number from 1 to 3;
(ii) titanium halides; and
(iii) organic halogen compounds.

As specific examples of the halogen or interhalogen compounds, chlorine, bromine, iodine, bromine chloride, iodine chloride, iodine trichloride, iodine bromide, etc., are illustrative. Of these compounds, iodine is particularly preferred.

As titanium halides, there are titanium tetrachloride, titanium tetrabromide, titanium tetraiodide and mixtures thereof. Of these compounds, titanium tetrachloride is particularly preferred.

As organic halogen compounds, those having 1 to 18 carbon atoms and 1 to 38 halogen atoms are preferred. Specifically, there are halogen-substituted alkanes such as carbon tetrachloride, chloroform, hexachloroethane, ethyl iodide, butyl iodide and the like.

Desirably, the reaction with the halogen compound is carried out in an inert hydrocarbon solvent such as hexane, heptane, octane, decane, benzene, toluene or xylene.

The treatment may be carried out using various procedures, for example, (i) the ether treated solid may be reacted with the halogen compound, (ii) the reduced solid may be reacted with the halogen compound and then reacted with the ether, (iii) the reduced product may be reacted with a mixture of the ether compound and the halogen compound, and (iv) the halogen compound may be added to the reduced reaction mixture obtained by reducing titanium tetrachloride with the organoaluminum compound in the presence of the ether compound. The catalytic activity of solid catalyst varies depending on the type of the halogen compounds used and reaction procedures. When a halogen, an interhalogen compound or an organic halogen compound as the halogen compound is used procedures (i) to (iv) may be adopted, but when the titanium halide is used procedures (i) to (iii) should be adopted. Accordingly, the required solid catalyst can be easily prepared by selecting the appropriate halogen compound and procedure.

The amount of the halogen or halogen compound used is usually about 0.001 to about 2.0 mols, preferably 0.005 to 1.0 mol, more preferably 0.03 to 0.5 mol, per mol of titanium trichloride, but not limited thereto. The reaction temperature can be optionally chosen, but is preferably from about −30° C. to about 200° C., more preferably from 0° C. to 150° C., most preferably 0° C. to 100° C.

The reaction time is also not particularly restricted, but usually periods of from about 5 minutes to about 5 hours are conveniently used.

As specific examples of preferred titanium trichloride, there may be given titanium trichloride disclosed in (1) U.S. Pat. No. 4,123,387 and (2) U.S. Pat. No. 4,165,298. Titanium trichloride in (1) is produced by reducing titanium tetrachloride with an organoaluminum compound, followed by reaction with a mixture of carbon tetrachloride and an ether. Titanium trichloride in (2) is produced by reducing titanium tetrachloride with an organoaluminum compound, followed by reaction with a mixture of an ether and a halogen or interhalogen compound or monohalogenated hydrocarbon.

Also, the titanium trichlorides disclosed in (3) British Pat. No. 1,391,068, (4) Japanese Patent Publication No. 24194/78 and (5) U.S. Patent Application Ser. No. 41,972 (filed May 23, 1979), U. S. Pat No. 4,246,135, can be used preferably.

Titanium trichloride in (3) is produced by reducing titanium tetrachloride with an organoaluminum compound, followed by treatment with a complexing agent and titanium tetrachloride in this order. Titanium trichloride in (4) is produced by reducing titanium tetrachloride with an organoaluminum compound in the presence of an ether and an iodine or an iodine compound, followed by contact with a releasing agent (Lewis acid). Titanium trichloride in (5) is produced by reducing titanium tetrachloride with an organoaluminum compound in the presence of an ether, followed by reaction with iodine.

The objects of this invention cannot be achieved by catalysts using commercial grades of titanium trichloride other than the titanium trichloride specified in this invention. For example, what is generally referred to as $TiCl_3.AA$ that is prepared by reducing titanium tetrachloride with metal aluminum and activating the reduced product by grinding, or the titanium trichloride prepared by reducing titanium tetrachloride with an organoaluminum compound and subjecting the reduction product to heat treatment cannot achieve the expected result.

The organoaluminum compounds preferably used in the present invention as catalyst component (B) are represented by the formula:

$$AlR^3{}_{3-m}X^3{}_m$$

wherein $R^3$ is an alkyl group having 1 to 18 carbon atoms, $X^3$ is a hydrogen, chlorine, bromine or iodine atom or an alkoxy group having 1 to 8 carbon atoms and m is a number satisfying the relation $0 \leq m < 3$. There are illustrated, for example, trialkylaluminum, alkylaluminum halide, alkylaluminum hydride, alkylaluminum alkoxide, alkylaluminum alkoxyhalide, etc. Of these, preferred compounds are dimethyl aluminum chloride, diethyl aluminum chloride, diisobutyl aluminum chloride, diethyl aluminum bromide, diethyl aluminum iodide, ethyl aluminum sesquichloride, a mixture of triethyl aluminum and diethyl aluminum chloride, a mixture of triethyl aluminum and ethyl aluminum dichloride. Diethyl aluminum chloride is particularly preferred.

The catalyst system used in this invention comprises the above specified two components, and it preferably contains a third component comprising a known electron donating compound. Common examples of electron donating compounds are those which contain an oxygen, nitrogen, sulfur or phosphorus atom, and aromatic compounds are also well known. Illustrative electron donating compounds include saturated or unsaturated aliphatic, alicyclic or aromatic esters such as ethyl acetate, methyl methacrylate, ethyl benzoate and ε-caprolactone; ethers such as dibutyl ether and tetrahydrofuran; organic sulfur-containing compounds such as butyl thioether and thiophenol; amines such as triethylamine and n-octylamine; organic phosphorus compounds such as tri-n-butylphosphine, triphenyl phosphite, tri-n-butyl phosphite, tri-n-butyl phosphate and hexamethyl phosphoryl amide; and aromatic compounds such as benzene, toluene and azulene. These electron donating compounds may be used alone or as a mixture of two or more compounds.

The proportions of the electron donating compound and the two catalyst components are suitably selected to obtain a good balance between a permissible decrease in catalytic activity and a tolerable amount of the atactic polymer produced. Generally, 0.01 to 100 mols, preferably from 0.02 to 10 mols, of the electron donating compound is used per mol of the catalyst component (A).

The catalyst components (A) and (B) and the optional electron donating compound may be charged into a polymerization vessel separately, or a mixture of either two or three components may be supplied to the vessel.

In the method of this invention, the proportion of ethylene and propylene to be supplied to the polymerization system must be so selected that the ethylene content in the resulting polymer is in the range of from 0.1 to 1.0 wt%, preferably from 0.2 to 0.8 wt%. In other words, ethylene is supplied to the polymerization system so that the ethylene concentration in the vapor phase of the system based on the total amount of ethylene, propylene and hydrogen in the vapor phase of the system is 0.15 to 1.5 mol%, preferably 0.3 to 1.2 mol%. If the ethylene content is less than 0.1 wt%, a polymer having satisfactorily high stretchability is not obtained. If the ethylene content is greater than 1.0 wt%, a stretched product obtained from the resulting polymer has only low mechanical properties.

The proportions of monomers to be supplied to the polymerization system may be selected so that a copolymer having the intended composition is produced in consideration of the relative reactivity of the monomers that is determined by polymerization conditions such as temperature, pressure, type of polymerization medium and catalyst. Suitable proportions will be readily determined by those skilled in the art.

The polymerization is performed in an inert organic solvent such as an aliphatic hydrocarbon such as butane, pentane, hexane or heptane; an alicyclic hydrocarbon such as cyclohexane or methylcyclohexane; or an aromatic hydrocarbon such as benzene or toluene. Alternatively, the polymerization may be performed in a liquid-phase monomer or gas-phase monomer substantially free from an inert organic solvent.

The polymerization temperature is in the range of from 0° to 200° C., preferably from 30° to 80° C. The polymerization pressure is freely selected from the range of atmospheric pressure to 100 kg/cm² depending upon the polymerization method used. Various molecular weight modifiers may be used to control the molecular weight of the resulting polymer, and hydrogen is generally used. Preferably, the hydrogen concentration in the vapor phase of the polymerization system based on the total amount of ethylene, propylene and hydrogen in the vapor phase of the system is 0.5 to 30 mol%. The polymerization may be carried out either continuously or batchwise. The polymerization time or average residence time in the reaction vessel may be of any value. For economy in the production, it is preferred that the step of removing the catalyst residue is omitted substantially or simplified, and this is achieved by selecting, with other polymerizations given, the polymerization time or average residence time so that at least 8,000 parts by weight of a copolymer may be produced per part by weight of the catalyst component (A).

The propylene-ethylene copolymers produced in this invention can be used for producing stretched products such as stretched films, stretched yarns, stretched tapes and stretched bands. The stretched film includes a uniaxially and biaxially stretched film. Suitably, the stretched products may be obtained by stretching unstretched products at a temperature of 80° to 170° C. with a stretching ratio of 3 to 10 times. Especially, in uniaxial stretching, a tubular (inflation) method or a T-die method may be applied, and in biaxial stretching, a tubular method or a flat method may be applied. In the flat method, unstretched films may be stretched simultaneously or successively (e.g., a tenter method).

Preferred forming conditions of biaxially stretched films according to the tenter method are as follows:

(1) Unstretched Film Preparation
  Extruding Temperature: 250° to 300° C.
  Cooling Roll Temperature: 20° to 50° C.
  Film Thickness: 300 to 3000μ
(2) Longitudinal Direction (LD) Stretching
  Stretching Temperature: 130° to 160° C.
  Stretching Ratio: 3 to 10 times
(3) Transversal Direction (TD) Stretching
  Stretching Temperature: 130° to 170° C.
  Stretching Ratio: 3 to 10 times Stretched products which can be obtained in this invention are superior in physical properties such as Young's modulus and mechanical strength to those obtained from the conventional propylene-ethylene copolymer.

The process of this invention is now described in greater detail by reference to the following Examples and Comparative Examples. It should be understood that these examples are given for illustrative purposes only and are by no means intended to limit the scope of the invention. The melt flow index, haze value, and Young's modulus of the sample polymers produced in the Examples and Comparative Examples were measured by the following methods:

(1) Melt flow index (M.F.I.): JIS K6758
(2) Haze value: ASTM D1003
(3) Young's modulus: ASTM D882

EXAMPLE 1

(1) Preparation of Catalyst (1) Method I (Preparation of Reduced Solid)

A 200-liter reactor was purged with argon and charged with 40 liters of dry hexane and 10 liters of titanium tetrachloride, and the solution was kept at −5° C. Then, a solution of 30 liters of dry hexane and 23.2 liters of ethyl aluminum sesquichloride was dropwise added thereto under the conditions such that the temperature of the reaction system is kept at −3° C. or below. The reaction mixture was stirred for 2 hours while keeping the temperature as it was. After completion of the reaction, the reaction mixture was allowed to stand, and the resulting reduced product was subjected to solid-liquid separation at 0° C. and washed twice with 40 liters of hexane to obtain 16 kg of a reduced solid.

(2) Method II

The reduced solid prepared in Method I was put into ndecalin to form a slurry having a slurry concentration of 0.2 g/cc. The slurry was subjected to heat treatment at 140° C. for 2 hours. After the reaction, the supernatant was withdrawn, and the residue was washed twice with 40 liters of hexane to obtain a titanium trichloride composition (A).

(3) Method III

Eleven kilograms of the titanium trichloride composition (A) prepared in Method II was put into 55 liters of toluene to form a slurry. To the slurry were added iodine and diisoamyl ether in such amounts that the molar ratio of titanium trichloride composition (A) to iodine to diisoamyl ether was 1:0.1:1.0, followed by reacting the mixture at 80° C. for one hour. After the reaction, the supernatant was withdrawn, and the residue was washed twice with 40 liters of hexane to obtain a solid titanium trichloride catalyst (B).

(2) Production of propylene-ethylene copolymer

A polymerization vessel (internal volume: 200 liters) equipped with a stirrer was thoroughly purged with propylene, and 68 liters of heptane, 13.6 kg of propylene and 0.005 kg of ethylene were introduced thereinto. After elevating the temperature of the vessel to 60° C., propylene, ethylene and hydrogen were fed such that the pressure was 10 kg/cm$^2$ gauge and the concentrations of ethylene and hydrogen in the gas phase were 0.5 mol% and 2.2 mol%, respectively.

Copolymerization was then initiated by supplying 3.1 g of the solid titanium trichloride catalyst (B) and 25 g of diethyl aluminum chloride (DEAC) and washing with 2 liters of heptane. The copolymerization was performed for 8 hours with the monomers supplied continuously to maintain the temperature, pressure and composition of the gas phase constant.

Isobutanol was supplied to the vessel to terminate the copolymerization, and 70 liters of heptane (60° C.) was supplied and the contents of the vessel were stirred for 30 minutes. A powdered copolymer was separated by a centrifuge and dried to give 26.5 kg of a desired powdered copolymer. The remaining heptane from which the powdered copolymer had been separated was concentrated to give 0.5 kg of a non-crystalline polymer.

The HIP%, or the weight percent of the powdered copolymer based on the total polymer produced was 98%, and the catalytic efficiency, or the amount of the total polymer produced per gram of the titanium trichloride catalyst component was 9200 g/g.

Infrared spectroscopic analysis showed that the ethylene content in the powdered copolymer was 0.3 wt%.

Comparative Example 1

The procedure of Example 1 was repeated except that ethylene was not supplied into the polymerization vessel. The HIP% was 99%, and the catalytic efficiency was 9000 g/g.

Comparative Example 2

The procedure of Example 1 was repeated except that ethylene was supplied to provide a powdered copolymer containing 2.0 wt% of ethylene. The HIP% was 96% and the catalytic efficiency was 9800 g/g.

Comparative Example 3

The procedure of Example 1 was repeated except that 10 g of Titanium Trichloride AA (TiCl$_3$.AA) produced by Toho Titanium Co., Ltd. was supplied to the polymerization vessel. The HIP% was 92% and the catalytic efficiency was 2900 g/g. The resulting powdered copolymer contained 0.3 wt% of ethylene.

Film Making

Each of the powdered copolymers prepared in Example 1 and Comparative Examples 1 to 3 was mixed with 0.2 wt% of a phenol type antioxidant, and the mixture was granulated to a pellet form. Each pellet was melt-extruded at 280° C. through a T-die extruder having a screw of 65 mm in diameter and quenched between chill rolls (35° C.) to form a sheet. The sheet was longitudinally stretched while heating at 140° C., then transversally stretched while heating with hot air at 160° C., and subjected to stretch heat treatment at 150° C. for 5 seconds to obtain a biaxially stretched film having a thickness of 30μ.

The stretching characteristics of the respective copolymers and the characteristic values of the thus obtained biaxially stretched films are shown in Table 1 below.

As is clear from Table 1, the propylene-ethylene copolymer prepared in Example 1 had good stretching characteristics and the film made of it had high Young's modulus. The polypropylene containing no ethylene (Comparative Example 1) had poor stretching characteristics. The propylene-ethylene copolymer containing 2% of ethylene (Comparative Example 2) had good stretching characteristics but the film made of it had low Young's modulus. The propylene-ethylene copolymer prepared in Comparative Example 3 by use of TiCl$_3$.AA, such use being not essential in this invention, had good stretching characteristics but the film made of it had low Young's modulus.

EXAMPLE 2

(1) Preparation of Catalyst (1) Method I (Preparation of Reduced Solid)

A 200-liter reactor was purged with argon and charged with 40 liters of dry hexane and 0.10 liters of titanium tetrachloride, and the solution was kept at −5° C. To the solution was dropwise added a solution of 30 liters of dry hexane and 11.6 liters of diethyl aluminum chloride under the conditions such that the temperature of the reaction system is kept at −3° C. or below. After the addition, the mixture was stirred for 30 minutes, heated to 70° C. and stirred for an additional one hour. The reaction mixture was allowed to stand and subjected to solid-liquid separation. The product was then washed three times with 40 liters of hexane to obtain 15 kg of reduced solid containing 4.60 wt% of aluminum.

(2) Method II (Preparation of Ether Treated Solid)

Fifteen kilograms of the reduced solid prepared in Method I was suspended in 40 liters dry hexane. To the suspension was added 1.2 mols of diisoamyl ether per mol of $TiCl_3$ in the reduced solid, and the mixture was stirred at 40° C. for one hour. After the reaction, the supernatant was withdrawn, and the residue was washed three times with 40 liters of hexane and dried.

(3) Method III

Ten kilograms of the ether treated solid in Method II was put into a solution of 30 liters of dry heptane and 20 liters of titanium tetrachloride, and the solution was heated at 70° C. for 2 hours. The supernatant was withdrawn, and the residue was washed three times with 30 liters of hexane and dried to obtain a solid titanium trichloride catalyst (C).

(2) Preparation of propylene-ethylene copolymer

A 30-$m^3$ polymerization vessel was continuously supplied with 1700 kg/hr of liquid propylene, 6 kg/hr of ethylene, 60 g/hr of the solid titanium trichloride catalyst (C), 600 g/hr of diethyl aluminum chloride and 50 g/hr of methyl methacrylate in the presence of hydrogen. The polymerization was performed by the flow method while controlling the internal temperature of the vessel at 70° C.

The polymerized slurry was continuously withdrawn from the bottom of the polymerization vessel in such a manner that the liquid level in the vessel be maintained constant, and the slurry was supplied to the top of a countercurrent multi-stage catalytic washing column (600 mm in diameter, 8200 mm in height) having a tier of 10 conical rotary discs.

Isobutanol (deactivator) was supplied to the middle of the column at the rate of one kilogram per hour.

On the other hand, a purified liquid-phase propylene held at 61°–64° C. was supplied continuously to the bottom of the column at a rate of 1100 kg/hr, and the charge of the column was quite slowly stirred at 12 rpm.

The insoluble polymer deposited on the bottom of the column was continuously withdrawn from the bottom into a flush tank through a reducing valve linked with a level meter. Thus, a powdered polymer was obtained in an amount of 720 kg/hr. The catalytic efficiency was 12000 g/g. The thus obtained powdered polymer contained 0.6 wt% of ethylene.

In contrast, liquid-phase monomers containing the reaction product between the catalyst and isobutanol, a soluble non-crystalline polymer and other materials that were soluble in the liquid-phase monomers were discharged from the top of the washing column and introduced into an atactic polymer recovery vessel. Thus, a non-crystalline copolymer was recovered in an amount of 2.9 kg/hr. The recovery of the atactic copolymer to the total polymer produced was 0.4%.

The resulting powdered copolymer was mixed with 0.2 wt% of a phenol type antioxidant, and the mixture was granulated to a pellet form. Each pellet had an M.F.i. of 1.2. The pellet was extruded through a blown-film die (230° C.) to form a film which was then slit and stretched at a ratio of 8 between rolls (130° C.) each having a different peripheral speed. Thus, a yarn having a denier of 1000 g/d was produced.

The yarn was set on a Schopper tensile tester and stretched at a rate of 300 mm/min. It was found that the strength of the yarn was 5.9 g/d and the degree of elongation was 0.20%, respectively.

Comparative Example 4

The procedure of Example 2 was repeated except that the ethylene was not supplied to the polymerization vessel. Pellets having an M.F.I. of 1.2 were produced. Yarns made of the pellets under the tensile test were found to have a strength of 5.0 g/d and an elongation of 15%. They easily split off along the longitudinal axis and they also had a tendency to get fluffy.

EXAMPLE 3

The procedure of Example 1 was repeated except that the concentration of ethylene in the gas phase was changed in the production of propylene-ethylene copolymer and 0.03 mol of ε-caprolactone was used as an electron donating compound per mol of the solid titanium trichloride catalyst (B). The HIP% was 99.2%, and the catalytic efficiency was 9050 g/g. The stretching characteristics of the resulting polymer and the characteristic values of the film made of it are shown in Table 1.

EXAMPLE 4

The procedure of Example 1 was repeated except that the concentration of ethylene in the gas phase was changed in the production of propylene-ethylene copolymer and 1.0 mol of methyl methacrylate was used as an electron donating compound per mol of the solid titanium trichloride catalyst (B). The HIP% was 99.3%, and the catalytic efficiency was 8900 g/g. The stretching characteristics of the resulting polymer and the characteristic values of the film made of it are shown in Table 1.

TABLE 1

| Polymer | Ethylene content (wt %) | Melt index | Stretching characteristics (MD × CD) | | | Stretching ratio (MD × CD) | Haze (4 films) % | Characteristic values of biaxially stretched-film Young's modulus (Kg/$mm^2$) | |
|---|---|---|---|---|---|---|---|---|---|
| | | | (4 × 7) | (5 × 7) | (7 × 7) | | | longitudinal direction | transversal direction |
| Ex. 1 | 0.3 | 2.0 | o | o | o | 7 × 7 | 2.3 | 125 | 320 |
| Com. Ex. 1 | 0 | 2.0 | o | Δ | x | 5 × 7 | 3.2 | 120 | 270 |
| Com. Ex. 2 | 2.0 | 1.9 | o | o | o | 7 × 7 | 2.1 | 100 | 230 |
| Com. Ex. 3 | 0.3 | 2.0 | o | o | o | 7 × 7 | 2.4 | 105 | 260 |
| Ex. 3 | 0.6 | 2.0 | o | o | o | 7 × 7 | 2.0 | 130 | 330 |

TABLE 1-continued

| Polymer | Ethylene content (wt %) | Melt index | Stretching characteristics (MD × CD) | | | Stretching ratio (MD × CD) | Haze (4 films) % | Characteristic values of biaxially stretched-film Young's modulus (Kg/mm²) | |
|---|---|---|---|---|---|---|---|---|---|
| | | | (4 × 7) | (5 × 7) | (7 × 7) | | | longitudinal direction | transversal direction |
| Ex. 4 | 0.5 | 2.1 | o | o | o | 7 × 7 | 2.1 | 135 | 340 | o Could be stretched into a film of even thickness
Δ Could be stretched but the resulting film was very uneven in thickness
x Stretching impossible due to cracking.

While the invention has been described in detail and with reference to specific embodiments thereof, it will be apparent to one skilled in the art that various changes and modifications can be made therein without departing from the spirit and the scope thereof.

What is claimed is:

1. In a process for producing a propylene-ethylene copolymer comprising copolymerizing propylene and a small amount of ethylene in the presence of hydrogen and a catalyst system comprising (A) titanium trichloride obtained by reducing titanium tetrachloride with an organoaluminum compound and reacting the reduced solid with an ether represented by the formula:

$$R^1-O-R^2$$

wherein $R^1$ and $R^2$ are each a straight chain, branched chain or cyclic alkyl group having 1 to 10 carbon atoms, and a halogen compound selected from the group consisting of (i) halogen or interhalogen compounds of the formula:

$$X^1X^2{}_a$$

wherein $X^1$ and $X^2$ are each a chlorine, bromine or iodine atom and a is a number from 1 to 3;

(ii) titanium halides; and (iii) organic halogen compounds, simultaneously or successively and (B) an organoaluminum compound, the improvement which comprises supplying ethylene together with propylene to the polymerization system such that the ethylene concentration in the vapor phase of the system based on the total amount of propylene, ethylene and hydrogen in the vapor of the system is 0.15 to 1.5 mol% to obtain a propylene-ethylene copolymer having an ethylene content of from 0.1 to 1.0 wt%.

2. The process of claim 1, wherein the ethylene concentration in the vapor phase of the system is 0.3 to 1.2 mol%.

3. The process of claim 1, wherein the hydrogen concentration in the vapor phase of the system based on the total amount of propylene, ethylene and hydrogen in the vapor phase of the system is 0.5 to 30 mol%.

* * * * *